Nov. 20, 1928.
A. E. BRONSON
1,692,024
QUICK DETACHABLE DUST CAP
Filed Aug. 16, 1924
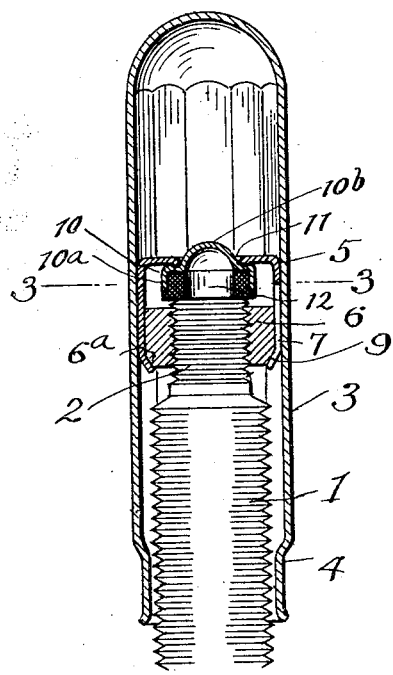
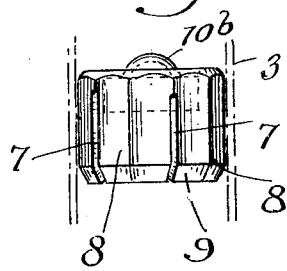
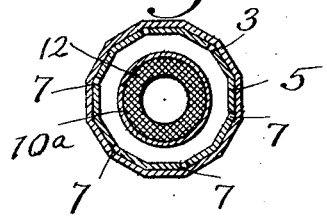
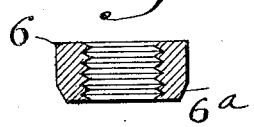
Inventor
Adelbert E. Bronson
By Thurston, Kwis & Hudson
Attorneys.

Patented Nov. 20, 1928.

1,692,024

UNITED STATES PATENT OFFICE.

ADELBERT E. BRONSON, OF CLEVELAND, OHIO, ASSIGNOR TO THE DILL MANUFACTURING COMPANY, OF CLEVELAND, OHIO, A CORPORATION OF OHIO.

QUICK-DETACHABLE DUST CAP.

Application filed August 16, 1924. Serial No. 732,407.

The present invention relates to a quick detachable dust cap which is adapted to be used in connection with valve stems for automobile tires or with a similar structure.

Reference should be had to the accompanying drawings forming a part of this specification, in which Fig. 1 is a sectional elevation of a dust cap of the present invention inserted upon a valve stem. Fig. 2 is an elevation of the member within the shell of the dust cap; Fig. 3 is a section upon the line 3—3 of Fig. 2; Fig. 4 is an elevation of a member forming a part of the quick detachable dust cap; Fig. 5 is sectional elevation of a nut forming a part of the structure.

Referring to the drawings, 1 indicates a valve stem of usual construction, the upper portion of which is of reduced diameter, and is externally threaded, as indicated at 2. The valve stem construction is standard and well known, therefore needs no detailed description. It is adapted to contain a valve insides of any desired or standard form.

The shell of the dust cap is indicated at 3, and is preferably formed of sheet metal, being tubular in shape having its outer end closed and its inner end open, the inner end being slightly reduced in diameter, as indicated at 4, thereby providing a shoulder which prevents the removal of the devices which are within the shell.

Within the shell there is a casing 5. This casing snugly fits within the shell, and when introduced is in close frictional contact with the shell, so that it will by its frictional engagement with the shell remain in any position within the shell, in which it is placed. Within the shell there is a nut 6. This nut has a central threaded opening which is adapted to engage with the end of a valve stem, clearly indicated in Fig. 1.

The casing 5 is provided with a plurality of slots 7 which thereby provide a plurality of spring-like fingers 8, these fingers at their outer ends being inturned as indicated at 9.

The nut 6 is in co-operation with the inner wall of each of these fingers, and the portion of the nut which engages with the inturned parts 9 is beveled, as indicated at 6ᵃ to correspond with the inturned portion 9 of the fingers 8. The nut 6 is free to move longitudinally with respect to the casing 5.

The casing 5 and the shell 3 are preferably formed of a plurality of sides, the casing being formed with a number of sides similar to that of the shell 3, and when the casing is introduced into the shell corresponding sides of the shell and casing will be in engagement thereby to prevent relative rotation between the shell and the casing. This construction is but indicative of any desired construction for the purpose of effecting nonrotation between the shell and casing.

Within the casing 5 there is a member 10. This is formed with a cup-shaped portion 10ᵃ, and an extending dome-shaped portion 10ᵇ.

In one end of the casing 5 there is a central opening 11 and through this opening the dome-shaped portion 10ᵇ is adapted to extend, and the portion of the casing immediately surrounding the opening 11 rests upon the shoulder formed between the cup-shaped part 10 and the dome-shaped part $b$ of the member 10. This affords but a limited area of contact between the casing and the member 10 so that relative rotation between the casing and the member 10 may readily take place.

Within the cup-shaped portion 10ᵃ there is an annular packing member 12 which is adapted to engage with the end of the valve stem 1 when the dust cap is introduced upon the valve stem. By providing the central annular opening in the packing 12 and the dome-shaped portion 10ᵇ there is no danger of the valve stem of the valve insides being interferred with to occasion leakage of air.

When the dust cap with the parts which are enclosed therein is introduced upon the end of a valve stem, the nut 6 will engage with the threaded end of the valve stem, and upon continued turning the nut will travel upon the end of the valve stem. The nut will carry with it the casing 5, and as soon as the end of the valve stem extends through the nut 6 it will engage with the packing 12 and thereafter continued rotation of the nut 6 will not move the casing 5, but on the other hand the nut 6 will move longitudinally with respect to the casing 5, and such movement will expand the spring fingers 8 into closer frictional contact with the wall of the dust cap 3 until finally the friction is so great as to prevent further rotation. By this time the dust cap is securely fastened to the valve stem by means of the nut and the frictional engagement between the casing 5 and the inner wall of the shell.

The packing 12 will also seal the end of the valve stem so as to prevent the escape or leakage of air, and in this respect performs the function of a valve cap which is customarily used for the end of the valve stem.

Having described my invention, I claim:

1. A quick detachable dust cap comprising a shell which is open at one end, a hollow member within the shell and having spring fingers adapted to engage with a wall thereof, said fingers having inwardly extending portions, a nut within the hollow member in engagement with the spring fingers and adapted to be screwed upon a valve stem, said nut being free to move longitudinally within said hollow member to engage the inwardly extending portions of the fingers and to press said fingers against the wall of the shell, and means within the hollow member for engaging with the end of a valve stem, interengaging parts of the shell, hollow member and nut holding the same against relative rotation.

2. A quick detachable dust cap comprising a shell which is open at one end, a hollow member within the shell and in frictional engagement with the wall thereof, a portion of the said hollow member being formed with spring fingers, said fingers having inwardly extending portions, a nut within the hollow member in engagement with the spring fingers and free to move longitudinally within said hollow member to engage the inwardly extending portions of the fingers, and means within the hollow member for engaging with the end of a valve stem, interengaging parts of the shell, hollow member and nut holding the same against relative rotation.

3. A quick detachable dust cap comprising a shell which is open at one end, a hollow member within the shell and in frictional engagement with the wall thereof, spring fingers carried by said hollow member, said fingers having inwardly extending portions, a nut within the hollow member in engagement with the spring fingers and free to move longitudinally within said hollow member to engage the inwardly extending portions of the fingers, and packing means within the said hollow member and for engaging with the end of a valve stem to prevent air leakage, interengaging parts of the shell, hollow member and nut holding the same against relative rotation.

4. A quick detachable dust cap comprising a shell which is open at one end, a hollow member within the shell and in frictional engagement with the wall thereof, spring fingers carried by said hollow member, said fingers having inwardly extending portions, a nut within the hollow member in engagement with the spring fingers and free to move longitudinally within said hollow member to engage the inwardly extending portions of the fingers and a member movable with the hollow member but rotatable with respect thereto, packing associated with said member for engaging with the end of a valve stem to prevent the leakage of air, interengaging parts of the shell, hollow member and nut holding the same against relative rotation.

5. A quick detachable dust cap comprising a shell which is open at one end, a hollow member within the shell and in frictional engagement with the wall thereof, spring fingers carried by said hollow member, said fingers having inwardly extending portions, a nut within the hollow member in engagement with the spring fingers and free to move longitudinally within said hollow member to engage the inwardly extending portions of the fingers, the said hollow member having an opening in the end thereof, a member having a dome-shaped portion which extends through said opening said member having a cup-shaped portion, a packing within said cup-shaped portion which is adapted to engage with the end of a valve stem for preventing air leakage, interengaging parts of the shell, hollow member and nut holding the same against relative rotation.

6. A quick detachable dust cap comprising a shell which is open at one end, a hollow member within the shell and in frictional engagement with the wall thereof, spring fingers carried by said hollow member, said fingers having inwardly extending portions, a nut within the hollow member in engagement with the spring fingers and free to move longitudinally within said hollow member to engage the inwardly extending portions of the fingers, the said hollow member having an opening in the end thereof, a member free to rotate with respect to the hollow member said member having a dome-shaped portion which extends through the opening in the hollow member, said member also having a cup-shaped portion, a packing within said cup-shaped portion adapted to engage with the end of a valve stem to prevent air leakage, interengaging parts of the shell, hollow member and nut holding the same against relative rotation.

7. A quick detachable dust cap comprising a shell which is open at one end, a hollow member within the shell and in frictional engagement with the wall thereof, said hollow member having spring fingers having inwardly extending portions engageable with the wall of the shell, a nut within the hollow member in engagement with the spring fingers and free to move longitudinally within said hollow member to engage the inwardly extending portions of the fingers to press said fingers against the wall of the shell, said nut being held against rotation with respect to said shell.

8. A quick detachable dust cap comprising a shell which is open at one end, a hollow member within the shell and in frictional engagement with the wall thereof said hollow member having a portion thereof slotted thereby to form spring fingers, said fingers having inwardly extending portions, a nut within the hollow member in engagement with the spring fingers said nut being free to move longitudinally within the hollow member to engage the inwardly extending portions of the fingers to press said fingers against the wall of the shell, said nut being held against rotation with respect to said shell.

9. A quick detachable dust cap comprising a shell which is open at one end, a hollow member within the shell and held against rotation with respect thereto, said hollow member having spring fingers provided with inwardly extending portions, a non-rotatable nut within the hollow member and adapted to be screwed upon a valve stem, said nut being movable longitudinally within the hollow member and adapted to engage the inwardly extending portions upon said fingers and thereby to control the friction between said shell and hollow member, and a packing member within the hollow member adapted to engage and seal the end of a valve stem when the nut is screwed upon the same.

In testimony whereof, I hereunto affix my signature.

ADELBERT E. BRONSON.